Sept. 22, 1953      A. Y. DODGE      2,652,816
THERMOSTATICALLY CONTROLLED CLUTCH AND FAN DRIVE
Filed March 26, 1949      3 Sheets-Sheet 1

INVENTOR:
Adiel Y. Dodge.
BY
ATTORNEYS.

Sept. 22, 1953           A. Y. DODGE           2,652,816

THERMOSTATICALLY CONTROLLED CLUTCH AND FAN DRIVE

Filed March 26, 1949           3 Sheets-Sheet 2

INVENTOR:
Adiel Y. Dodge,
BY Dawson, Ooms, Booth and Spangenberg
ATTORNEYS.

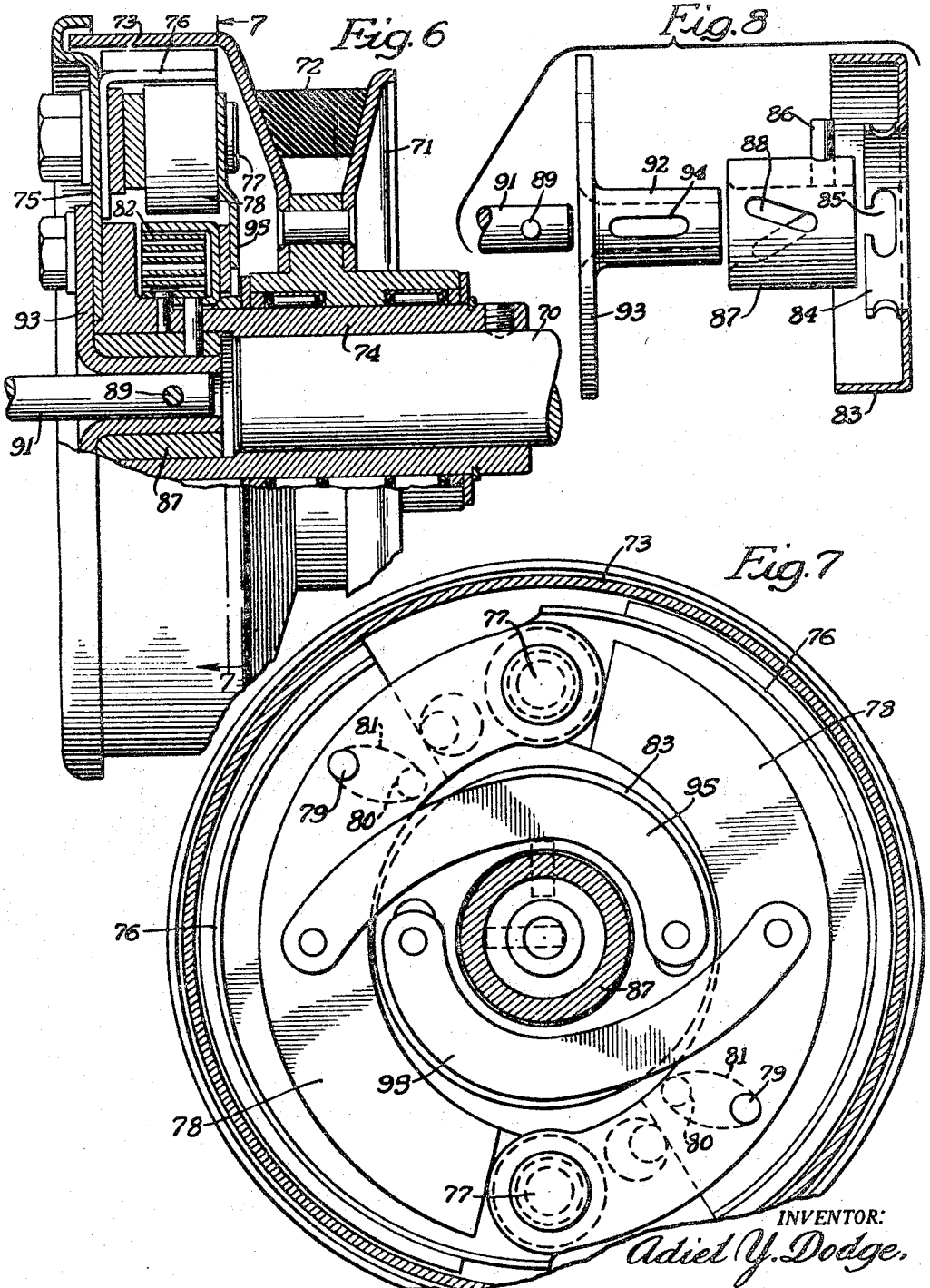

Patented Sept. 22, 1953

2,652,816

UNITED STATES PATENT OFFICE 2,652,816

THERMOSTATICALLY CONTROLLED CLUTCH AND FAN DRIVE

Adiel Y. Dodge, Rockford, Ill.

Application March 26, 1949, Serial No. 83,662

21 Claims. (Cl. 123—41.12)

This invention relates to speed responsive clutches and particularly to a thermostatically controlled speed responsive clutch. For purposes of illustration, this invention will be described with reference to a clutch for controlling a fan forming a part of the cooling system of an internal combustion engine, but it is understood that the invention is not limited to such application.

The principal object of this invention is to provide a thermostatically controlled clutch for driving the fan of an internal combustion engine, the clutch being disconnectable when the temperature of the coolant for the engine is below the recommended operating temperature of the coolant.

A specific object of this invention is to provide a thermostatically controlled friction clutch for a fan, wherein the clutch will engage quickly to avoid a harmful prolonged slip period of the clutch.

Another object is to provide a speed responsive clutch which can be externally controlled to effect engagement and disengagement at various speeds or independent of speed.

A further object is to provide a speed responsive clutch which will be held disengaged regardless of speed until it is released in response to an external control force.

Another specific object of this invention is to provide a thermostatically controlled clutch, with means for converting a slow movement of a thermally actuated element into a snap action, which snap action is utilized to engage the clutch.

A still more specific object of this invention is to provide an automatically operated friction clutch, the operating force of which is obtained from one or more centrifugally operated weights, with spring-and-lever means for holding the weights in clutch-releasing position and with a thermostat for releasing the spring-and-lever means at a predetermined temperature of the thermostat. It is contemplated that once released, the means will remain released until both the speed of the drive means for the clutch and the temperature of the thermostat indicate that the spring-and-lever means should again be engaged to hold the clutch in released position.

These and other objects and features of this invention will become apparent from the following detailed description when taken together with the accompanying drawings, in which Figure 1 is a schematic diagram of a typical internal combustion engine and its cooling fan and radiator;

Figure 6 is an axial section with parts in elevation of an alternative clutch construction embodying the invention;

Figure 7 is a section on the line 7—7 of Figure 7; and

Figure 8 is an exploded view of the clutch control parts.

Figures 1, 2:
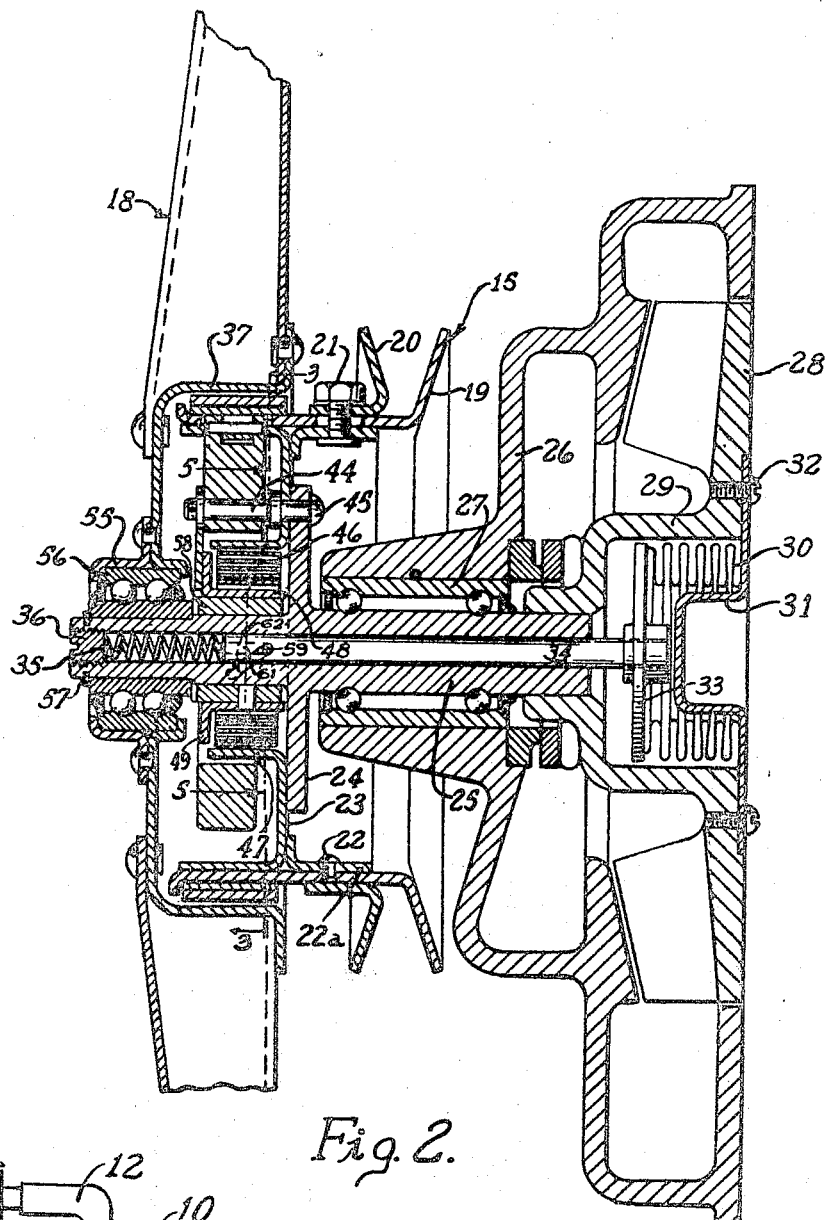
Figure 2 is an enlarged section through the drive means of the fan including the clutch of the present invention.

Referring now to the drawings for a detailed description of the invention, and particularly to Figure 1, there is shown an internal combustion engine 10 which may be of the automotive type, the combustion chambers of which are substantially enclosed with a jacket containing a coolant which is circulated through a radiator 11 by means of conduits 12 and 13. A pump 14, driven by a pulley 15 and belt 16 from the crankshaft 17, forces the coolant to circulate through the jacket and radiator, and the same pulley 15 is made to drive a fan 18 through the novel clutch to be hereinafter described. The function of the fan is to draw cooling air through the radiator and over the engine.

The drive for the fan as well as the pump is shown in section in Figure 2 to which reference is now made. Pulley 15 is comprised of a pair of stampings 19 and 20 which are held in spaced relation by adjustment bolts 21. Stamping 19 is riveted at 22 to a drum 22a which in turn is spot welded to a second drum 23. Said drum 23 is secured to a flange 24 on a hollow shaft 25. A pump housing 26 supports a bearing 27 in which shaft 25 is rotatably mounted. A pump impeller 28 is pressed upon and rotatable with the right-hand end (Figure 2) of shaft 25, said pump impeller 28 having an enlarged hollow hub 29 in which is disposed a thermostat in the form of a gas-filled bellows 30 which is fixed at the right-hand end (Figure 2) to a stamping 31 which in turn is secured to pump impeller 28 at 32. The opposite end 33 of bellows 30 abuts on a rod 34 reciprocable in hollow shaft 25, the other end of rod 34 bearing against a spring 35 held in hollow shaft 25 by an adjustable plug 36. Stamping 19 extends axially into the hub 37 of fan 18, said hub 37 being in the form of a drum which constitutes the driven element of the clutch by which the fan is driven. In order than fan 18 and its supporting hub 37 may be rotatable on shaft 25, independently of pulley 15, said hub 37 is riveted to a flanged retainer 55 within which is held a ball bearing 56 mounted on shaft 25. Snap rings 57 fix the bearing 56 axially on shaft 25.

Figure 3:
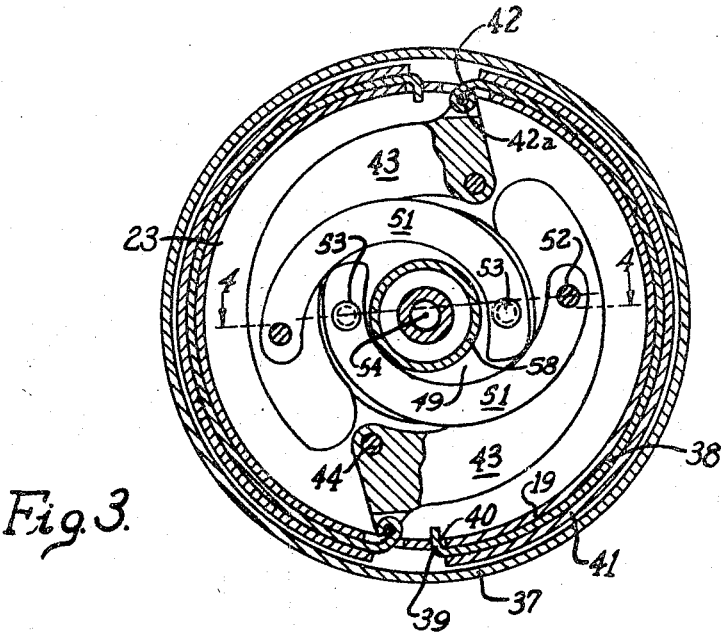
Figure 3 is a front elevation in section of the clutch taken along line 3—3 of Figure 2.
Figure 4:
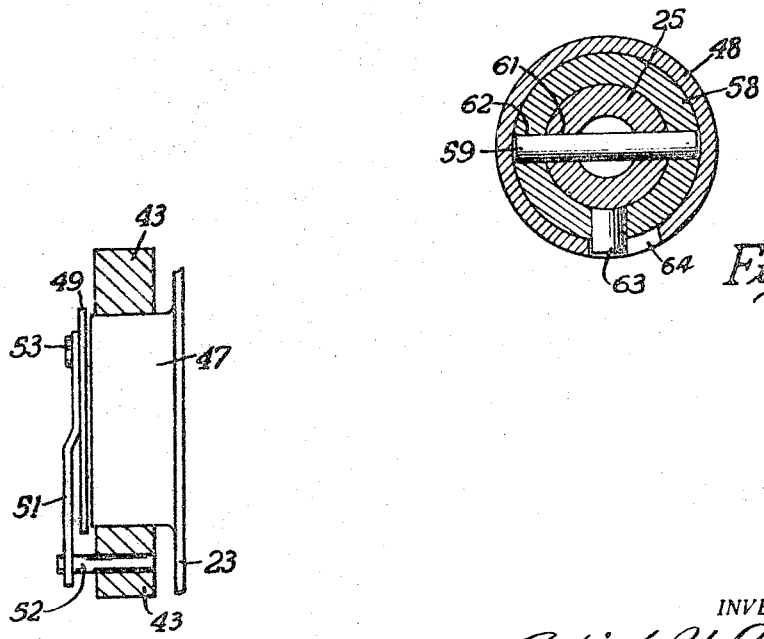
Figure 4 is a fragmentary section along line 4—4 of Figure 3, with parts in side elevation showing the means for holding the weights of the fan clutch in clutch-releasing position.

Referring now to Figure 3, the driving element is comprised of one or more flexible band segments or shoes 38 which are anchored at one end 39 in a slot 40 in stamping 19. A friction facing 41 is secured to the exterior of each shoe 38 and is adapted to engage frictionally the interior of hub drum 37 to drive the latter. The opposite end 42 of each shoe 38 is pivotally secured to a pin 42a mounted on a weight 43 which in turn is mounted at 44 to drum 23. The pivoted mounting 44 may be an elongated end of the rivet 45 (Figures 1 and 4) used to secure drum 23 to flange 24. Thus weight 43 is rotated at all times with drum 23 and pulley 15, and because of the eccentric mounting of pivot 44, weight 43 will tend to rotate clockwise about said pivot as viewed in Figure 3, thereby tending to move end 42 of shoe 38 outward into engagement with hub 37.

Weight 43 is retracted by means of a clock-type spring 46 (Figure 2) which is secured at its outer end to a flange 47 on drum 23 and at its inner end to a sleeve 48 having a radially outwardly disposed flange 49 at one end. A curved link 51 (Figure 3) connects flange 49 to weight 43, the end 52 of link 51 connected to the weight 43 being farther from the center of rotation of shaft 25 than the end 53 connected to cylinder 47, thus amplifying the movement of the sleeve 48 and insuring a very short slip period. Spring 46 is so wound that it will normally tend to rotate sleeve 48 and flange 49 in a clockwise direction as viewed in Figure 3, thus rotating weight 43 counterclockwise and withdrawing shoe 38 from contact with hub 37 to disengage the clutch. The clutch thus far described is similar to that more fully disclosed and claimed in my prior application, Serial No. 14,197, filed March 11, 1948, now abandoned.

It is contemplated that weight 43 will be held in its retracted position by spring 46, since spring 46 is strong enough under any operating speed to hold the weights in retracted position so long as the linkage is on or over center. To release the weights an auxiliary control, under the action of thermostat 30, is provided. The auxiliary control, in effect, helps latch the weights in retracted condition and does not release them until the temperature of the coolant at the thermostat is sufficiently high to warrant the operation of the fan. The auxiliary control utilizes the over-center or toggle relationship between the center of shaft 25 and the points of attachment of link 51 to the flange 49 and weight 43 to lock the clutch in released condition irrespective of the speed of rotation of the weights.

Referring particularly to Figure 3, it will be observed that a line drawn through points 52 and 53, which are the pivots for link 51, will pass above the center 54 of the shaft 25 about which sleeve 48 rotates. Therefore, centrifugal pull on the link 51 by the weight 43 and the spring force will both tend to raise the points 52 and 53 of the lower link 51 and turn the flange 49 clockwise. This is prevented by engagement of the link with sleeve 58 which is rotatably mounted on the shaft 25 so that the weights and friction shoes 38 will be held in the disengaged position shown in Figure 3 until the sleeve 48 is turned counterclockwise far enough to bring the line connecting points 52 and 53 below the center 54. In the construction of Figures 1 to 5 this is accomplished by the thermostat 30.

Figure 5:
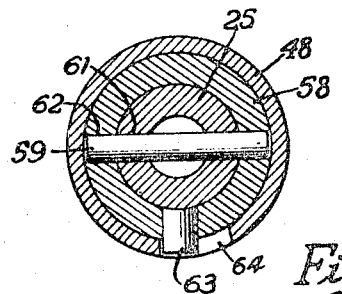
Figure 5 is a section on the line 5—5 of Figure 2 showing the clutch control means.

The axial movement of rod 34 under the action of thermostatic bellows 30 is translated into rotary movement of the sleeve 58 by a pin 59 (Figures 2 and 5) carried by the rod 34 and slidable in an axial slot 61 in shaft 25. The pin 59 engages an angular slot 62 in the sleeve 58 as best seen in Figure 5 so that when the rod 34 moves axially, the sleeve 58 will be turned on the shaft 25. The sleeve 58 carries a pin 63 fitting into an elongated slot 64 in the sleeve 58 to provide a lost motion connection between the sleeves 48 and 58. As the rod 34 is moved to the left as seen in Figure 2 by the thermostat, the pin 59 will turn the sleeve 58 counterclockwise as seen in Figure 5 to turn sleeve 48 counterclockwise. As the sleeve 48 moves counterclockwise, it will lower the pivot connection 53 at the left of the axis 54 as seen in Figure 3 and raises the pivot 53 at the right until the line connecting the pivot points 52 and 53 as described above passes below the center 54. At this time the over-center relationship is destroyed and the weights can move outward by centrifugal force during which movement they will turn the sleeve 48 through the links. During initial movement of the weights, they have a relatively low mechanical advantage with respect to the spring, but as the weights move outward, the angle of the pivot connection 53 relative to the center changes so that the mechanical advantage of the weight relative to the spring increases. Thus, if the centrifugal force is sufficient to start the weights moving outward against the spring, they will move rapidly to their extreme outer position, thereby moving the friction shoes quickly and positively into engagement with the drum to connect the driving member to the drum with a reduced slip period. It will be noted that due to the lost motion 63, 64 the weights can move outward once the over-center relation of the links has been released without being compelled to expand the thermostat farther.

It is contemplated that at idling speeds of the engine, weights 43 will not generate enough centrifugal force to overcome the action of spring 46 and hence will always collapse and release the clutch at idling speeds unless the coolant is above the critical temperature so that the thermostat 30 pushes linkage 51, 52, 53 out of dead center position.

When the device herein described is installed in an automobile vehicle, if the engine is started cold, spring 46 will have latched weight 43 in its released position while the engine is stationary and thermostat 30 will be in its collapsed condition, thereby offering no resistance to the latching of the weight. Thus, on a cold start, fan 18 is disengaged from pulley 15 and hence will permit the engine to warm up more quickly. As the engine warms up, the coolant will be circulated by pump 14 and will likewise warm up, thus expanding thermostat 30 which in turn will push rod 34 to the left as viewed in Figure 2. When a predetermined critical temperature is reached, cylinder 48 will be rotated as described above, and if at that time the weight 43 is acted upon sufficiently by centrifugal force to engage shoe 38 with hub 37, the engagement will take place with a snap action and with little or no slip between facing 41 and hub 37. It will be noted that shoes 38 are supported to provide a servo action which will insure a rapid and complete engagement of the clutch. The operation of the clutch, once released for operation by the thermostatic control, is substantially identical to the operation of the clutch described and claimed in my aforesaid application, Serial No. 14,197, filed March 11, 1948, and hence will not be described in detail here.

After the clutch is engaged, that is, facing 41 if frictionally driving hub 37, the clutch will remain engaged as long as the speed of rotation of drum 23 is above the critical speed of the centrifugal weights. If the engine, while operating, should become cool to the point where driving the fan is not desired, thermostat 30 will be collapsed, but the clutch will nevertheless remain engaged until the engine speed is somewhat reduced, whereupon cylinder 48 will be rotated by contraction of the bellows and the springs 46 and 35 to the released position of weights 43 and will remain in this position until the temperature of the engine is again increased. It will be noted that with the clutch turning in the normal counterclockwise direction as seen in Figure 3, deceleration tends to move the weights in to assist in disengaging the clutch.

While the action of the linkage 51 has been described as moving past dead center in order to latch the clutch against engagement, in practice the latched condition can be reached when the linkage scarcely assumes a dead center relation, since the spring under these conditions works at a tremendous mechanical advantage over the weights so that the weights cannot overcome the force of the spring at any normal operating speed.

The construction shown in Figures 6, 7 and 8 is generally similar to that of Figures 2 to 5 and functions in substantially the same manner. As shown, this construction comprises a driving shaft 70 which may be any desired shaft and which is adapted to drive a pulley 71 engaged by a belt 72. The pulley is formed with a cylindrical flange 73 at one side which comprises a drum to be engaged by friction shoes carried by the driving member.

As shown, the shaft 70 is connected to hub 74 having a radial supporting flange 75 on which rigid shoes 76 are pivoted. The shoes are pivoted on diametrically opposite pivots 77 on the support 75 and carry friction material frictionally to engage the inner surface of the flange or drum 73.

The shoes are adapted to be moved out into engagement with the drum by weights 78 also pivoted on the pivots 77 and lying closely adjacent to the shoes. In the arrangement shown, the shoe at the left of Figure 7 is pivoted on the bottom pivot and is connected to the weight 78 which is pivoted on the top pivot by means of a link 81 pivotally connected at 79 to the weight and at 80 to the shoe. It will be understood, however, that this arrangement could be reversed if desired so that the weight which actuates a shoe is pivoted at the same point as the shoe. The advantage of the construction shown is that the pin connection between the weight and shoe can be adjacent the pivot of the weight and adjacent the free end of the shoe so that the weight has a large mechanical advantage over the shoe.

The weights are controlled by a mechanism similar to that of Figures 1 to 5 including a coil spring 82 connected at one end to the hub 74 and at its opposite end to a housing or cage 83. As best seen in Figure 8, the cage 83 has an outer flange overlying and secured to the spring and a center hub flange 84 by which it is rotatably supported on the hub 74 and which is formed with a series of elongated slots 85. The slots 85 are adapted to receive pins 86, of which only one is shown, carried by a sleeve 87 which is rotatably mounted on the hub 74. The sleeve 87 is formed with a pair of annular slots 88 to be engaged by a pin 89 on an operating rod 91. The rod 89 is slidable in the elongated tubular hub 92 of a flanged plate 93 which is rigidly secured to the hub 74 and the supporting flange 75. The hub portion 92 carries an axial slot 94 through which the pin 89 may project.

In assembling the parts, the cage 83 may be shifted away from the pin 86 by removing the flanged plate 93 and shifting the sleeve 87 to the left. At this time, the cage 83 may be turned to wind the spring 82 to the desired tension and the sleeve 87 may then be shifted to the right to bring the pin 86 into one of the slots. The flanged plate 93 may then be secured to the hub 74 and the spring will be held in its wound position under the desired tension.

The weights are connected to the cage 83 to be controlled thereby by means of links 95 pivoted at one end to the weights and at the opposite end to the face of the cage 83. As seen in Figure 7, the links are curved so that when the weights are in their inner positions a line connecting the ends of the links will pass substantially through the axis of the assembly to produce an overcenter locking relationship. At this time centrifugal force on the weights cannot move them outward so that the parts will be held in the position shown with no driving connection between the shaft 70 and the pulley 71.

To release the weights for engagement of the clutch the rod 91 may be moved outward or to the left and through the annular slots 88 will turn the sleeve 87 counterclockwise as seen in Figure 7. This will cause the pin 86 to engage one end of slot 85 and will turn the cage 83 counterclockwise to move the links out of their overcenter position and to release the weights for outward movement in response to centrifugal force. At this time as the speed of the driving shaft is sufficient to overcome the spring, the weights will move outward rapidly and will quickly bring the shoes into engagement with the drum with a minimum of slipping. To disengage the clutch mechanically or manually, the rod 91 may be moved to the right to turn the sleeve 87 clockwise thereby assisting the spring 82 to pull the weights inward to the locking position shown in which the shoes disengage the drum. It will be understood that the rod 91 can be controlled manually, thermostatically as in Figures 1 to 5, or in any other desired manner to produce engagement or disengagement of the clutch thereby overruling the automatic centrifugal action of the clutch at desired times.

While two embodiments of the invention have been shown and described in detail therein, it will be understood that they are illustrative only and are not intended as a definition of the scope of the invention, reference being had for this purpose to the appended claims.

What is claimed is:

1. A speed responsive clutch comprising a driving element, a driven element, friction means for coupling the driving element to the driven element, said means including a drum on the driven element, friction shoes on the driving element, and pivoted weights mounted on the driving element and connected to the friction shoes to move them into contact with the drum; and means for controlling the operation of the clutch comprising a thermostatic element, and locking means connecting the thermostatic element to the weights, said locking means preventing operation of the weights until a predetermined temperature is reached in the thermostatic element.

2. The construction of claim 1 in which said locking means includes an overcenter linkage.

3. The construction of claim 1 in which said locking means includes a rotatable sleeve, links connecting the sleeve to the weights and adapted to assume an overcenter relation with respect to the center of the sleeve, spring means urging the links to overcenter relation, and means connecting the thermostatic element to the sleeve to oppose the action of the spring means.

4. A speed responsive clutch comprising a driving element, a driven element, a drum on the driven element, friction shoes on the driving element, pivoted weights rotatable with the driving element, connections between the weights and the shoes, such that the shoes are expanded into contact with the drum to drive the latter when centrifugal force moves the weights radially outward, resilient means carried by the driving member and having one end anchored to said driving member, means connecting the other end of the resilient means to the weights to hold the weights in their inward position against the action of a predetermined centrifugal force, said means including stop means to hold the weights in retracted position regardless of the amount of centrifugal force developed in the weights, a thermostat, and means connecting the thermostat to the said means connecting the other end of the resilient means to the weights and adapted to move said other end away from the stop to free the weights for operation.

5. The construction of claim 4, in which said means connecting the other end of the resilient means includes also a rotatable member cooperating with the stop means in one position to hold the weights in retracted position and rotatable to another position to free the weights for radial outward movement.

6. The construction of claim 4 in which said thermostat has a rectilinear movement and said means connecting the other end of the resilient means includes also a rotatable sleeve and means for translating the rectilinear movement of the thermostat into curvilinear movement to rotate said sleeve.

7. The construction of claim 4 in which said thermostat has a rectilinear movement and said means connecting the other end of the resilient means includes also a rotatable sleeve having a direct connection with the resilient means so as to be movable therewith, links connecting the sleeve to the weights to transmit the force of the resilient means to the weights, said links being adapted to assume an overcenter relationship with respect to the center of rotation of the sleeve, and said means connecting the thermostat to the means connecting the other end of the resilient means to the weights including a cam device for translating the rectilinear movement of the thermostat into a curvilinear movement to rotate the sleeve into and out of said overcenter relationship.

8. In combination, a rotatable fan, a drum rotatable with the fan, a hollow shaft, a pump mounted on one end of the shaft, bearing means on the other end of the shaft for supporting the fan, a flange on the shaft intermediate the pump and bearing means, a drive pulley secured to the flange for rotation therewith, friction shoes driven from the pulley and disposed within the drum, a plurality of weights pivotally mounted on the flange and connected to the shoes to expand the shoes into contact with the drum to drive the drum and fan from the pulley, and means for controlling the operation of the weights, said controlling means comprising a thermally responsive element located adjacent the pump, a spring means connected at one end to the pulley, means connecting the other end to the weights, the spring being disposed to urge the weights to retracted position, and means connecting the thermally responsive element to the last-mentioned means and adapted to hold the weights in retracted position until the temperature of the thermally responsive element reaches a predetermined value.

9. The combination described in claim 8 in which the means connecting the thermally responsive element to the last-mentioned means comprises a push-rod disposed in the hollow shaft and contacting the thermally responsive element at one end, and means connecting the rod to the weights for converting axial movement of the rod to pivotal movement of the weights.

10. The combination described in claim 8 in which said spring is a spiral spring and the means connecting the other end to the weights comprises a rotatable sleeve and links connecting the sleeve to the weights.

11. The combination described in claim 8 in which said spring is a spiral spring, and the means connecting the other end to the weights includes a rotatable sleeve and links connecting the sleeve to the weights, at least one link having one end thereof connected to the sleeve at one side of the center of rotation of the sleeve and the other end thereof connected to a weight on the other side of the said center of rotation such that an overcenter relation is established between the link, the weight attached thereto and the sleeve.

12. The combination described in claim 8 in which the means connecting the other end of the spring to the weights includes a rotatable sleeve, and the means connecting the thermally responsive element to the last-mentioned means includes a cam slot in the sleeve, a rod movable with the thermally responsive element and disposed in the hollow shaft, and a pin on the rod cooperating with said cam slot and adapted to convert rectilinear movement of the rod to rotary movement of the sleeve.

13. A speed responsive clutch comprising a rotary driving element, a rotatable driven element, friction means for coupling the driving element to the driven element, said means including a drum on the driven element, friction shoes on the driving element, and pivoted weights mounted on the driving element and connected to the friction shoes to move them into contact with the drum; and means for controlling the operation of the clutch, said means comprising a part rotatably mounted on the driving element coaxially therewith, links pivotally connected at their opposite ends to the weights and said part and adapted to assume a substantially dead center relation in which opposite ends thereof lie on opposite sides of the axis of the driving member whereby to prevent operation of the weights, and means to move said part to move the links from said dead center relation thereby to release the weights for movement in response to centrifugal force.

14. The construction of claim 13 including a spring urging the part in a direction to move the links toward said dead center relation.

15. The construction of claim 13 including a spring urging the part in a direction to move the links toward said dead center relation and in which the moving means includes a control rod movable axially of the drum.

16. The construction of claim 13 including a lost motion connection between the moving means and the part.

17. A speed responsive clutch comprising a driving element, a driven element, a drum on the driven element, a pair of friction shoes on the driving element, pivoted weights rotatable with the driving element, connections between the weights and the shoes, such that the shoes are expanded into contact with the drum to drive the latter when centrifugal force moves the weights radially outward, resilient means carried by the driving member and having one end anchored to said driving member, a revoluble cake member housing the resilient means and connected to one end thereof, means connecting the other end of the resilient means to the driving member thus to resiliently hold the weights in their inward position against the action of centrifugal force, linkage connecting the cage member and the weights in a manner such that in the retracted position of the weights the linkage pivots approach dead center, thereby to lock the weights inwardly against centrifugal force, a reciprocable rod cam means operably connected to said rod to be rotated in response to reciprocation of the rod, and a lost motion connection between the cam means and the cage member whereby reciprocation of the rod will rotate the cage member to aid the resilient means in holding the weights inwardly or to oppose the resilient means so that the weights may be allowed to move outwardly.

18. A speed responsive clutch comprising a driving element, a driven drum, a flexible friction shoe secured adjacent one end to the driving element, a weight pivoted on the driving element to swing outward in response to centrifugal force, a connection between the weight and the other end of the shoe to expand the shoe into contact with the drum as the weight moves out, a rotatable member lying radially inward of the weight, a link connecting the rotatable member to the weight and crossing the center of the rotatable member, and a spring urging the rotatable member to a position in which the connections of the link to the weight and rotatable member are substantially aligned with the center of the rotatable member to hold the weight in.

19. A speed responsive clutch comprising a driving element, a driven element, a drum on the driven element, friction shoes on the driving element, pivoted weights rotatable with the driving element, connections between the weights and shoes such that the shoes are expanded into contact with the drum to drive it when centrifugal force moves the weights radially outward, resilient means carried by the driving element and having one end anchored to said element, means connecting the other end of the resilient means to the weights to hold the weights in their inward position against the action of a predetermined centrifugal force, said means including stop means to hold the weights in their inward position, regardless of the amount of centrifugal force developed in the weights, a movable control member, and means connecting the control member to the last named means to move the last named means away from the stop means to free the weights for operation.

20. A speed responsive clutch comprising a driving element, a driven element, a drum on the driven element, friction shoes on the driving element, pivoted weights rotatable with the driving element, connections between the weights and shoes such that the shoes are expanded into contact with the drum to drive it when centrifugal force moves the weights radially outward, a rotatable sleeve carried by the driving element coaxially therewith, links connecting the rotatable sleeve to the weights and arranged to cross the axis of the sleeve thereby to hold the weights in their inward position regardless of the amount of centrifugal force developed thereby, a spring connecting the sleeve to the driving element and urging the sleeve in a direction to move the links to a position crossing the axis of the sleeve, a control rod movable axially through the sleeve, and cam elements connecting the control rod to the sleeve to turn the sleeve upon axial movement of the control rod thereby to free the weights for operation in response to centrifugal force.

21. The construction of claim 20 in which the sleeve is mounted on a tubular hub on the driving element, the sleeve and hub are formed with cam slots lying at different angles to their axis, and the control rod carries a pin extending into both of the slots.

ADIEL Y. DODGE.

References Cited in the file of this patent

UNITED STATES PATENTS

| Number | Name | Date |
|---|---|---|
| 796,886 | Wood | Aug. 8, 1905 |
| 1,039,305 | Martin | Sept. 24, 1912 |
| 1,625,777 | Kuchen | Apr. 19, 1927 |
| 2,320,900 | Walz | June 1, 1943 |
| 2,376,939 | Ricart | May 29, 1945 |
| 2,417,197 | Hewitt et al. | Mar. 11, 1947 |